Figure 1:
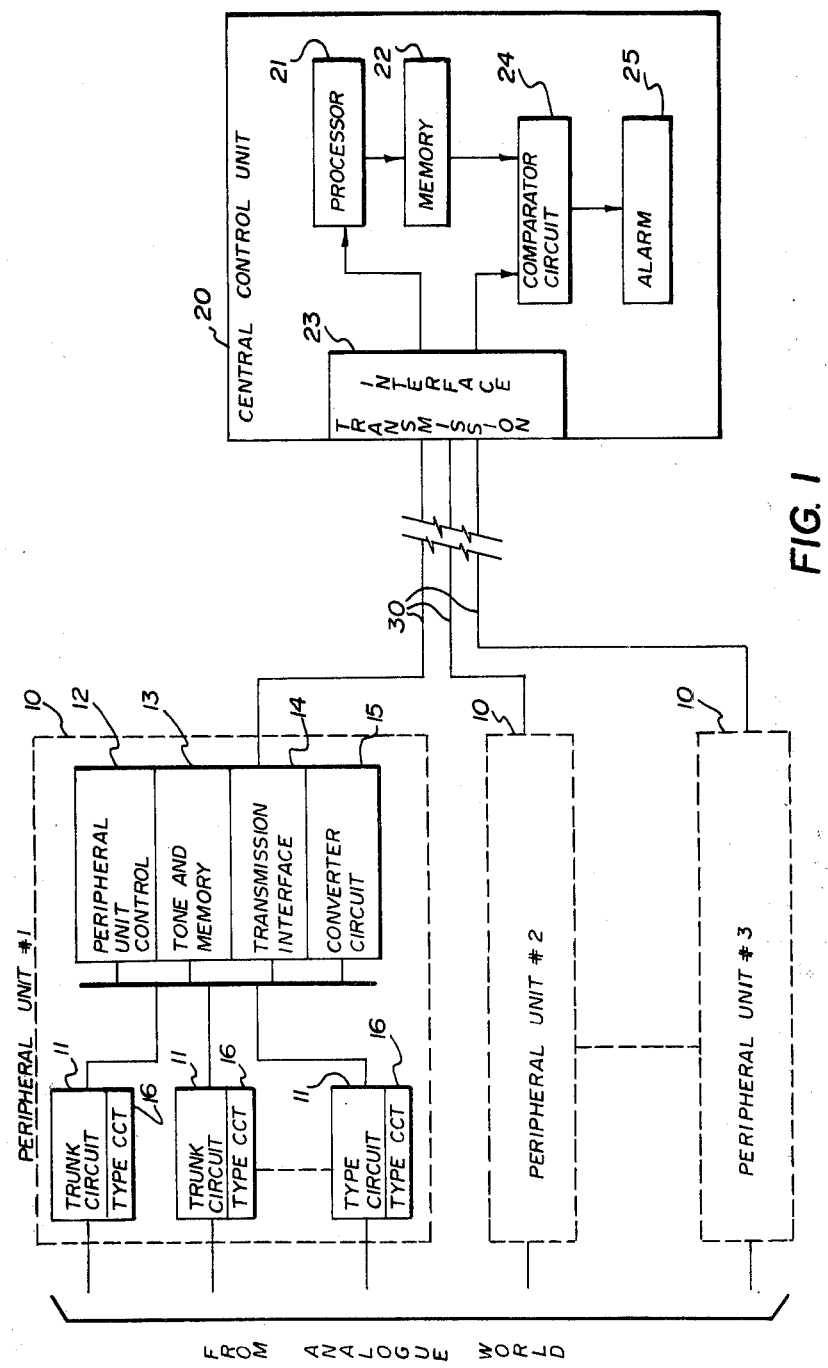

United States Patent [19]

Munter

[11] 4,138,599
[45] Feb. 6, 1979

[54] MODULAR COMMUNICATION SYSTEM HAVING SELF-IDENTIFYING MODULES

[75] Inventor: Ernst A. Munter, Ottawa, Canada

[73] Assignee: Northern Telecom Limited, Montreal, Canada

[21] Appl. No.: 847,237

[22] Filed: Oct. 31, 1977

[51] Int. Cl.² .......................................... H04M 1/24
[52] U.S. Cl. .............................. 179/175; 179/15 BF; 340/146.1 C
[58] Field of Search ........... 179/175, 175.2 R, 175.21, 179/15 AE, 15 BF, 2 A, 2 AR, 1 MN; 340/146.1 C, 146.1 E, 266, 408; 235/302

[56] References Cited

U.S. PATENT DOCUMENTS

| | | | |
|---|---|---|---|
| 3,922,490 | 11/1975 | Pettis | 179/2 AM |
| 3,943,348 | 3/1976 | Akriche | 340/146.1 E |
| 4,041,455 | 8/1977 | Norberg | 340/146.1 C |

OTHER PUBLICATIONS

Western Electric Technical Digest, No. 26, 4-1972, "Testing System Utilizing a Resistor in a Plug in Module Specifically to Identify the Unit," Comeau, p. 21.

*Primary Examiner*—Thomas A. Robinson
*Assistant Examiner*—Gerald L. Brigance
*Attorney, Agent, or Firm*—Frank Turpin

[57] ABSTRACT

Trunk and line circuits packaged as modules are provided with circuitry for generating self-identifying type-code information which is retrievable on request by the central control unit of the system. The received information is compared with the type-code information contained in the data memory of the central control unit. Upon non-correlation between the received and the stored type-code information, an alarm signal is generated. In the described embodiment, the type-code information generating circuitry on each board comprises a voltage level source individual of the type of board and an analog to digital converter circuit associated with the board.

9 Claims, 2 Drawing Figures

MODULAR COMMUNICATION SYSTEM HAVING SELF-IDENTIFYING MODULES

The invention relates generally to modular communications systems and more particularly to telephone systems wherein each module of the peripheral units thereof are adapted to generate self-identifying type-code information.

In the last few years, most communication systems that have been developed have used a modular construction in their implementation. In such a system, the majority of sub-systems are packaged on respective printed circuit boards which are inserted into card racks mounted on a frame. For example, in the contemporary telephone systems which use pulse code modulation and time division multiplexing techniques, the architectural layout of the systems is modular. A central control unit usually comprises a switching network and a central processor which is connected by data links to a large number of peripheral units which provide the interface to the outside world. These peripheral units consist mainly of large quantitities of trunk and line circuits. A full size office may have as many as sixty thousand trunk circuits and one hundred thousand line circuits. These circuits are conventionally divided into small groups each of which has common control circuitry for controlling the operation of the circuits as well as the interface to the central control unit of the office and the outside world. The size of each group of circuits is usually chosen such that it may be completely mounted on a single shelf of printed circuit boards. As is well known, the peripheral circuits of any one office may comprise a mixture of a large number of different types of circuits. For example, any one office may comprise incoming and outgoing trunk circuits, a variety of signalling trunk circuits as well as a large variety of special function trunk circuits such as CAMA and announcement trunks. In addition, any one trunk board position may be replaced with special function boards such as conference circuits and MF and/or digitone receiver boards. A similar variety of types of boards exists when the peripheral units comprise line circuits.

Because of the large variety of types of printed circuit boards that are used in a telephone switching office, the use of modular construction in such a system has created a very onerous problem, that of maintaining system integrity through the manufacturing checkout of the system as well as through the installation and maintenance procedures of the office.

As a system reaches the checkout stage of manufacture, the equipment bays are loaded with the printed circuit cards and the system is usually checked automatically. A digital computer program for emulating the input and output loading of the system is activated and it exercises a full range of operations of the system. It is often found that a substantial proportion of faults uncovered at the initial stages of the checkout procedures are due to improperly located printed circuit cards in the shelves. This type of mistake is easily made when it is considered that such a system comprises a large number of frames of equipment each having a large number of printed circuit cards and that the only noticeable difference in the majority of the faceplates for these cards is usually in the code number. In addition, many cards having the same number are sometimes located in different slots on different shelves. In order to verify the physical integrity of a frame of equipment it is necessary to verify the location of the cards against a chart. That in itself is a tedious operation which further contributes to the problem.

The same problem occurs when the system is being installed or is undergoing a maintenance procedure. Many of the cards are pulled out, put aside for a period of time, and then reinserted in what is hoped are the correct positions. Quite often, this is not the case and the original problem cause of the maintenance procedure becomes compounded.

The attempts at solving this problem have usually been directed at a visual differentiation between cards; that is, different types of cards have been provided with different colour faceplates so that they may be easily recognized. This solution may be effective in a small system, but, in a system wherein the peripheral frames of the system may have thousands of cards and shelves, the different colour faceplates do not contribute significantly to the solution of the problem of misplaced cards.

Applicant has found that the physical system integrity of a contemporary electronic modular system may be achieved and maintained through its working life very simply and economically by providing each individual printed circuit board of the peripheral units with the means of generating type-code information individual to the type thereof.

The invention also provides a system for surveying the integrity of an electronic modular system having a plurality of types of modules each one of which is located at a respective addressable location accessible by a control unit which has a data storage means containing type-code information associated with respective ones of the modules of the system. Each module of the system has a respective memory means containing type-code information associated therewith. Each of the modules comprises means associated therewith and responsive to a polling signal from the central control unit for transferring its type-code information thereto. The central control unit is provided with means for comparing the received type code information with the type-code information contained in its data storage means at the location associated with the polling signal. The central control unit is also provided with means for generating an error signal upon non-correlation between the received type-code information and the data storage means type-code information.

From another aspect of the invention, there is provided a method for surveying the integrity of an electronic modular system having a central control unit having data storage means containing type-code information associated with respective ones of the modules of the system and wherein each module is located at a respective addressable location accessible by the central control unit. Each of the modules is polled to cause it to transfer the type-code information stored in its respective memory means to the central control unit. The type-code information received from the modules is compared with the typecode information contained in the data storage means of the central control unit, and upon non-correlation between the received type-code information and the data storage means type-code information an error signal is generated.

In addition to providing an electronic modular system with the capability of surveying its physical integrity, the invention provides a number of other important advantages. Since each type of printed circuit board is provided with a means of identifying itself to the outside world, the boards are adapted for use in a fully automatic test set which exercises all the functions of the boards. Upon insertion of a board into the test set, the latter reads the type-code information associated with the board and is thereby able to recognize which test sequence is relevant for that type of board. This obviates the need for the test set to be provided with an extensive and usually complex setting-up procedure for different types of board. It also obviates or at least greatly minimizes the occurrence of human error during these test procedures. In the case where the invention is used in an electronic modular system which uses pulse code modulation and time division multiplexing techniques, the type-code information of each type of board may be generated thereon with an active circuit which comprises a source of analogue signal converted to a digital signal. A further advantage of using the invention in such a system is that the operation of the analogue to digital converter associated with the boards may be verified by requesting the board to output its type-code information.

Figure 2:
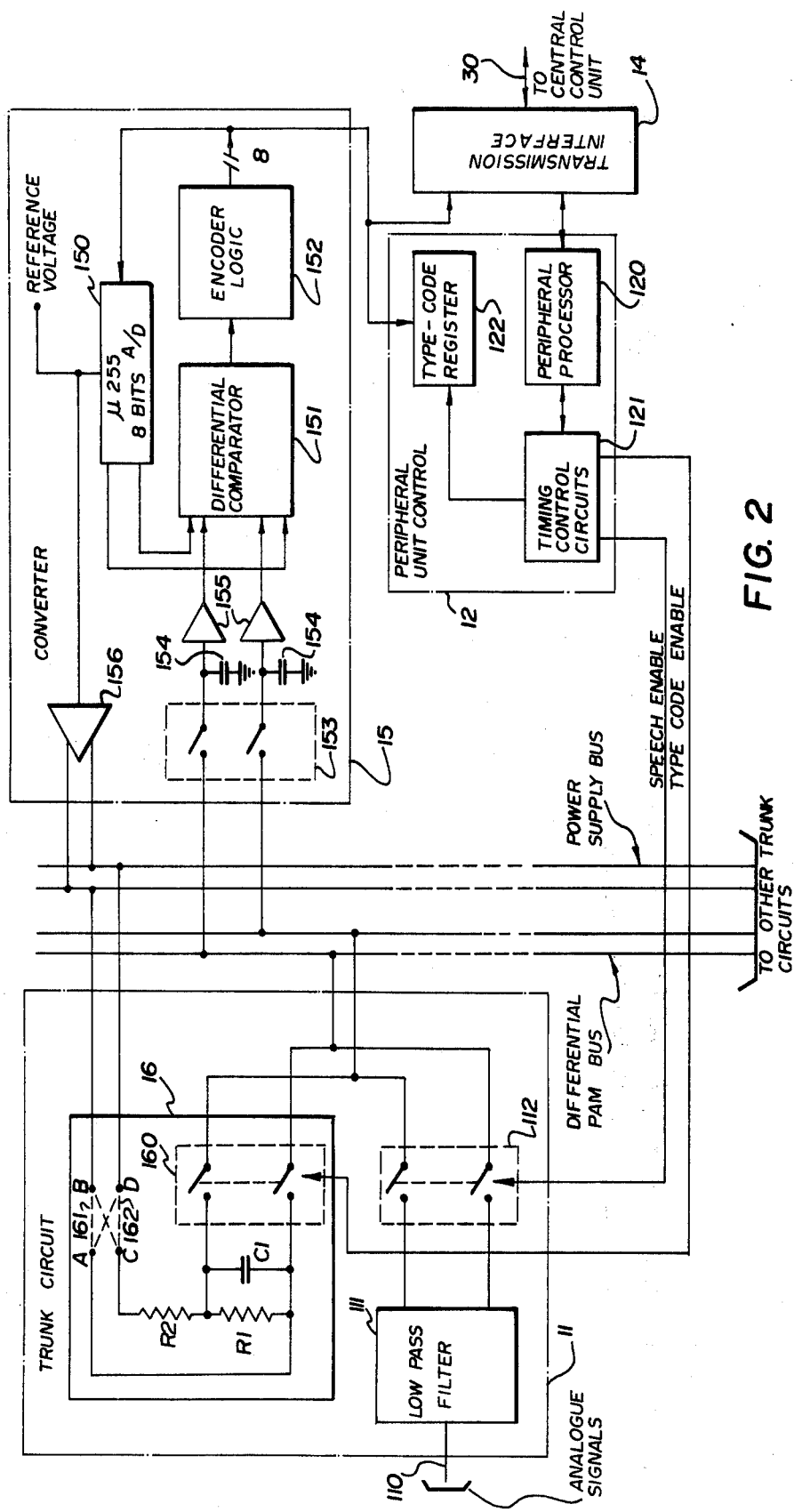

Further features and advantages of the invention will become evident from the following description of an example embodiment of the invention in which:

FIG. 1 is a block diagram of a modular electronic telephone system using the invention; and FIG. 2 is a block schematic diagram of a peripheral unit shown in FIG. 1.

FIG. 1 is a block diagram of a modular electronic telephone system using pulse code modulation and time division multiplexing techniques. Only those portions of the system necessary to the understanding of the invention are shown. A plurality of peripheral units 10 are connected on one side to a source of analogue signals (e.g. speech) and on the other side to a central control unit 20 of a switching system via data links 30. Each peripheral unit 10 represents a shelf of printed circuit cards or modules such as may be found in a contemporary switching office.

As is conventional in systems using distributed processing, a peripheral unit performs the majority of repetitive or routine real time significant tasks associated therewith, under control of a peripheral processor. The functions of a peripheral unit 10, in this case a trunk unit, include scanning, converting analogue to digital signals and digital to analogue signals, and multiplexing the digital signals into a serial digital signal for transmission to the central control unit of the office. The trunk unit 10 is also responsible for generating digital tones as well as sending signalling and control information to the central control unit. In order to provide these functions, the trunk unit 10 is provided with a peripheral unit control circuit 12 (including a peripheral processor), a tone and memory circuit board 13, a transmission interface circuit board 14, and a converter circuit board 15. Each trunk circuit 11 represents a printed circuit card or module, and since as explained earlier, a variety of functions have to be performed by the trunk circuits, a corresponding variety of types of trunk circuits are required. In any one central office, up to about twenty-five different types of trunk circuits may be in use. Therefore, in accordance with the invention, each trunk circuit 11 is provided with a type circuit 16. Each type circuit 11 provides type-code information individual to that board. In response to a request or polling signal from the central control unit each trunk is adapted to output its type-code information which is transmitted via the converter circuit 15 and the transmission interface circuit board 14 to the central control unit 20.

As is conventional, the central control unit is provided with a processor circuit 21, a data memory 22, and an interface transmission circuit 23. In addition, the central control unit is shown to include a comparator circuit 24 and an alarm circuit 25 responsive thereto. The comparator circuit 24 may be of any well-known type such as is available commercially, and the alarm circuit may be of the audible or visual type, or of the type which generates a signal to cause a printout such as on a teletypewriter.

Briefly, the operation of the system of FIG. 1 is as follows. Whenever the central control unit 20 is directed (automatically, or through directions from a maintenance operator), to verify or survey the physical integrity of the switching system, it issues polling signals, each one associated with a respective trunk circuit 11. In response to the polling signal, each trunk circuit 11 outputs its type-code information which is transmitted to the central control unit 20 via the transmission interface circuit 14, a data link 30, and the transmission interface circuit 23. When the type-code information is received from a particular trunk circuit, the processor causes the memory 22 to output the type-code information related to the polling signal that caused the received type-code information from the trunk circuit. The received type-code information and the central control unit memory type-code information are compared in the comparator circuit 24 to determine the correlation of the two signals. Upon non-correlation of the signals, the alarm circuit 25 is responsive to the output signal of the comparator circuit for providing an indication of a problem which may then be acted upon.

The central control unit was only described in block diagram form since all of the circuit blocks shown are conventional in the art and may be realized employing a variety of well-known circuits.

FIG. 2 is a block schematic diagram of the trunk circuit 10 illustrated in FIG. 1. Only those portions of the trunk unit necessary to the understanding and implementation of the invention are described.

FIG. 2 shows a converter module 15, a peripheral unit control module 12, and a transmission interface module 14. The tone and memory module 13 shown in FIG. 1 is omitted from the diagram of FIG. 2 because it is not relevant to the invention.

The control module 12 serves as the central control unit for the trunk unit and it controls the internal operation thereof. It is shown to comprise a peripheral processor 120, timing control circuits 121, and a type-code register 122 the function of which will become evident below.

The transmission interface module 14 is of conventional design and comprises multiplexing circuitry as well as various transmission circuits and buffers. It serves to receive and transmit digital signals to the central control unit 20 (FIG. 1) via the data link 30 and to interface these signals to the remainder of the trunk unit 10.

The module 15 is a successive approximation converter circuit and comprises a companding ($\mu 255$) A/D converter circuit 150, a differential comparator 151, encoder logic circuit 152, and a sample, hold, and stretch circuit including gates 153 connected to a differential pulse amplitude modulation (PAM) bus, capacitors 154 and amplifiers 155. The functions provided by modules 12, 14 and 15 are well known and may be realized using conventional circuits and components. In addition, the converter module 15 includes an amplifier 156 having its input connected to the source of reference voltage of the converter circuit 150. The amplifier 156 provides an output voltage in balanced configuration to a balanced power supply bus and it may simply consist of an operational amplifier in balanced output configuration.

Both the power supply bus and the differential PAM bus extend to each trunk circuit 11. The differential nature of the PAM bus insures that a minimum of noise is created thereon.

FIG. 2 shows only one of the plurality of trunk circuits 11 comprising the trunk unit. In some cases, a trunk unit may have as many as twenty-four or even thirty trunk circuits and similar trunk circuits may be packaged two per printed circuit card. As is conventional, an input port 110 of the trunk circuit 11 is connected to a source of analogue signals which are filtered in a lowpass filter 111 and appear at the input of a differential pulse amplitude modulation (PAM) gate 112 which is controlled by sampling signals - speech enable signals - from the peripheral unit control board 12 for generating PAM signals on the differential PAM bus. Also included in each trunk module 11 is a type circuit 16 which comprises a resistor bridge $R_1R_2$, capacitor $C_1$ connected across resistor $R_1$ and a differential PAM gate 160 controlled by sampling signals on the type-code enable lead from the timing control circuits 121 in the peripheral unit control module 12. Upon the occurrence of these sampling signals, the gate 160 is responsive to provide PAM signals on the differential PAM bus. These signals correspond to the analogue voltage level across resistor $R_1$.

The resistor bridge $R_1R_2$ is connected to the power supply bus via a pair of straps 161 and 162 connected to terminals AB and CD respectively. If the straps 161 and 162 are connected to terminals AD and CB respectively the polarity of the analogue voltage across the resistor bridge $R_1R_2$ is inverted. This has the effect of doubling the number of useful PCM codes which may be encoded. It should be noted that the resistor bridge $R_1R_2$ may simply be connected across a source of voltage and the voltage reversal straps located between the capacitor $C_1$ and the PAM gate 160. However, the provision of a balanced power supply source derived from the reference voltage supply of the converter provides an important advantage. It allows the voltage applied to the PAM gate via the resistor bridge to be controlled within upper and lower limits which follow the variation of the converter reference voltage supply. The range of voltage determined by the resistor ratio defines the quantity of PCM codes available for type coding.

For example, if the reference voltage of the codec is 5 volts, it is desirable to provide a differential voltage at the sampling gate input varying between 0.3 and 5 volts. This ensures that a PCM word corresponding to the analogue voltage signal across $R_1$ corresponds to a code derived from the segments of the converter companding curve which are higher than the midpoint thereof. This has the advantage that the resistors used in the bridge $R_1R_2$ are not required to be special tolerance resistors. This is because the $\mu 255$ companding curve has a logarithmic shape and the incremented difference between the upper and lower codes of the upper four segments vary by at least three percent. Therefore, the use of one percent resistors in the type-coding resistor bridge $R_1R_2$ is well within the tolerance required for the effective discrete encoding of various types of modules. Of course, it is entirely possible to use the lower portion of the companding curve; however the tolerance of the resistors must be chosen accordingly. Increasingly lower tolerance of resistors is necessary as the origin of the curve is approached.

BRIEF DESCRIPTION OF OPERATION

Under normal conditons the circuits of the peripheral unit of FIG. 2 perform their functions in the conventional manner. Analogue signals appear at the input port 110, are filtered in the filter circuit 111 and are converted to digital signals by the PAM gate 112 and the codec circuitry 15 under control of the peripheral control unit 12. The resulting PCM information is buffered and multiplexed in the transmission interface circuit 14 and transmitted serially on the digital line 30 under control of the central control unit. Of course, since there are a plurality of trunk circuits, each one is enabled in a sequential and orderly manner and, as is conventional in a system using PCM and time division multiplexing, the information from the various sources (e.g. trunk circuits) is allocated to respective channels and is timely transferred to the central control unit. Conversely, information from the central control unit is received at the peripheral unit in an orderly manner thereby enabling the latter to identify the destination (e.g. trunk circuit) of the various pieces of information. In addition to the information channels corresponding to the individual trunk circuits, at least one extra channel is usually provided between each peripheral unit and the central control unit. This channel is often designated the signalling channel and is used in the system for exchanging control information between the peripheral unit and the central control unit.

When it is desired to survey the physical integrity of the system, such as in a maintenance procedure, the central control unit instructs the processor of the peripheral unit to provide type-code information related to the modules in the unit. During the signalling channel time slot, the peripheral processor 120 causes the timing control circuits 121 to provide a type-code enable signal to the PAM gate 160. The speech PAM gate 112 is not enabled during the signalling time slot. The voltage level across resistor $R_1$ is sampled by PAM gate 160 and this signal appears on the differential PAM bus and is applied to the converter circuit 15 which converts it to a companded PCM word representing the type of module. This PCM word may be transmitted directly to the central control unit via the interface circuit 14 or it may be stored in the register 122 for timely transfer to the central control unit which is then in a position to correlate the received type-code information with that contained in its data memory. In this manner, the central control unit is able to determine the type of module at every location in each of the peripheral units.

It should be realized that other types of type-code information generators may be provided at every module without departing from the scope and spirit of the invention. For example, each module may be provided with a memory means in which is stored a PCM code word representing the type of module; this word being retrievable on command from the central control unit. However, the embodiment described herein provides the advantages of economy and simplicity in addition to causing the converter circuit to be exercised every time that the type-code information is requested thereby verifying its operation.

It should also be noted that under some circumstances, it may be desirable to provide a module which includes both the analogue reference voltage source and the codec, thereby obviating the need for a multiplexed PAM bus.

What is claimed is:

1. In an electronic modular system having a central control unit and a plurality of types of modules each one being located at a respective addressable location accessible by the central control unit, said central control unit having data storage means containing type-code information associated with respective ones of the modules of the system, a system for surveying the integrity of the modular system comprising:

each module of the system having a respective memory means containing type-code information associated therewith, each of said modules comprising means responsive to a polling signal for transferring said type-code information to the central control unit;

means located in the central control unit for comparing the received type-code information with the type-code information contained in its data storage means at the location associated with said polling signal; and means for generating an error signal upon non-correlation between the received type-code information and the data storage means type-code information.

2. In an electronic modular system having a central control unit and a plurality of types of modules each one being located at a respective addressable location accessible by the central control unit, said central control unit having data storage means containing type-code information associated with respective ones of the modules of the system, and each module of the system having a respective memory means containing type-code information associated therewith, a method for surveying the integrity of the modular system comprising:

polling each of the modules to cause them to transfer the type-code information stored in their respective memory means to the central control unit;

comparing the received type-code information from the modules with the type-code information contained in the data storage means of the central control unit; and generating an error signal upon non-correlation between the received type-code information and the data storage means type-code information.

3. In an electronic modular system having a central control unit and a plurality of types of modules each one being located at a respective addressable location accessible by the central control unit, said central control unit having data storage means containing type-code information associated with respective ones of the modules of the system, a system for surveying the integrity of the modular system, comprising:

each module of the system having means for generating type-code information associated therewith, each of said modules comprising means responsive to a polling signal for transferring said type-code information to the central control unit;

means located in the central control unit for comparing the received type-code information with the type-code information contained in its data storage means at the location associated with said polling signal; and means for generating an error signal upon non-correlation between the received type-code information and the data storage means type-code information.

4. A system as defined in claim 3 wherein the electronic modular system is a pulse code modulation system and each module has an analogue to digital converter associated therewith, said generating means comprising said converter and a voltage level source for providing an analogue signal to the converter for conversion to a pulse code modulation word representing said type-code information associated with the module.

5. A system as defined in claim 4 wherein said electronic modular system is a time division multiplex system and wherein said generating means further comprises a register means for storing said pulse code modulation word for timely transfer of said word to the central control unit.

6. A system as defined in claim 4 wherein said voltage level source is a resistor bridge connected across a voltage power supply, said voltage level source being accessible to the converter through a pulse amplitude modulation gate.

7. A system as defined in claim 6 wherein said voltage level source includes means for inverting the connection of the voltage power supply across the resistor bridge.

8. A system as defined in claim 7 wherein said voltage power supply is derived from the reference voltage supply of the converter.

9. A system as defined in claim 7 wherein said voltage power supply is a differential reference voltage supply derived from the reference voltage supply of the converter.

* * * * *